United States Patent [19]

Nakayama et al.

[11] Patent Number: 5,717,043
[45] Date of Patent: Feb. 10, 1998

[54] PROCESS FOR PREPARING A POLYMER USING LITHIUM INITIATOR PREPARED BY IN SITU PREPARATION

[75] Inventors: Atushi Nakayama; Koichi Morita; Masaaki Izuchi, all of Tokyo, Japan

[73] Assignee: Bridgestone Corporation, Tokyo, Japan

[21] Appl. No.: 731,530

[22] Filed: Oct. 16, 1996

[30] Foreign Application Priority Data

Oct. 16, 1995 [JP] Japan .................. 7-267434

[51] Int. Cl.$^6$ .................. C08F 4/48; C08F 12/04; C08F 36/04
[52] U.S. Cl. .................. 526/180; 526/176; 526/178; 526/181; 526/204; 526/217; 526/220; 526/335; 526/340; 525/331.9; 525/332.3; 525/332.9; 525/342; 525/370; 525/374; 525/383; 525/385; 525/386
[58] Field of Search .................. 526/180, 173, 526/217, 220, 204, 178, 181; 525/331.9, 332.3, 332.9, 342, 370, 374, 383, 385, 386

[56] References Cited

U.S. PATENT DOCUMENTS

| 2,849,432 | 8/1958 | Kibler et al. . |
| 5,332,810 | 7/1994 | Lawson et al. . |
| 5,552,473 | 9/1996 | Lawson et al. ............. 526/180 X |

FOREIGN PATENT DOCUMENTS

| 594 107 | 4/1994 | European Pat. Off. . |
| 48-17674 | 5/1973 | Japan . |
| 48-7674 | 5/1973 | Japan ............. 526/180 |
| 50-79590 | 6/1975 | Japan . |
| 54-22484 | 2/1979 | Japan . |
| 6199921 | 7/1994 | Japan . |

OTHER PUBLICATIONS

Butyl Lithium–Catalyzed Stereoselective Telomeriaztion of 1,3–Diene—A Novel Synthesis of 1,3–Diene—A Novel Synthesis of H,H–Dialkyl(OCTA–cis–2,6–Dienyl) Amine Derivative Tetrahedron Letters No. 39, pp. 4009–4012, 1972, Pergamon Press.

*Primary Examiner*—Fred Teskin
*Attorney, Agent, or Firm*—Sughrue, Mion, Zinn, Macpeak & Seas, PLLC

[57] ABSTRACT

In a polymerization process of at least one of monomers selected from the group consisting of conjugated diene compounds such as butadiene and vinylaromatic compounds such as styrene, an organolithium compound such as butyllithium is added to the polymerization system first in the presence of the monomer, and thereafter a secondary amine compound such as saturated cyclic imine is added thereto to produce a soluble initiator by bringing the both compound into contact with each other. Polymerization is carried out with the soluble initiator formed. The obtained high molecular weight polymer is modified with a coupling agent such as tin tetrachloride. The polymer obtained has a high molecular weight, a narrow molecular weight distribution, and controlled molecular weight, and exhibits remarkable coupling property, low hysteresis loss. The process provides a polymer having a consistent characteristic, regardless of production scale and procedures of adding materials.

14 Claims, No Drawings

PROCESS FOR PREPARING A POLYMER USING LITHIUM INITIATOR PREPARED BY IN SITU PREPARATION

BACKGROUND OF THE INVENTION

1. Field of the invention

The present invention relates to a process of preparing a polymer from a conjugated diene monomer and/or a vinylaromatic hydrocarbon monomer by using a lithium polymerization initiator. More particularly, the present invention relates to a process for preparing a polymer in which the process has excellent efficiency of polymerization initiation and high reproducibility of polymerization. The molecular weight and the microstructure of the polymer obtained by the process are easily controllable and the molecular weight distribution of the polymer is narrow. Further, the present invention relates to a process for preparing a polymer which has a low hysteresis loss and a high molecular weight, and which can be modified with a coupling agent or an electrophilic agent after polymerization.

2. Description of the Related Art

The need to reduce fuel cost for automobiles has been increasingly emphasized in recent years. As a result, rubber compounds used for tire treads have been extensively studied with the intent of reducing hysteresis loss. Process for preparing a polymer with a molecular structure having a secondary amine group at the end of the polymer chain has also been studied to this end.

One such process is the polymerization of a conjugated diene by using a lithium amide separately prepared in a solvent in advance as a polymerization initiator U.S. Pat. No. 2,849,432). However, because lithium amides are often insoluble or hardly soluble in many solvents, storage stability can be poor and storage and handling of the lithium amides difficult. When the lithium amide having poor or no solubility is used as the initiator in some polymerizations, efficiency of the polymerization initiation is low because the concentration of the soluble effective initiator necessary for the polymerization is low. Furthermore, the concentration of the soluble effective initiator is not reproducible and accurate evaluation of the concentration is difficult. Therefore, this process usually causes numerous unfavorable results. For example, the molecular weight distribution of the polymer is made broader and reproducibility thereof is insufficient. Furthermore, the control of structure of the polymer, such as molecular weight, microstructure and the like, by molecular design is made difficult and not reproducible.

Another such process is the polymerization of a conjugated diene and a vinyl aromatic hydrocarbon by using, as the initiator, soluble lithium amides containing a dienyl polymer or the like having an extremely low molecular weight as an additional component and separately prepared in advance (U.S. Pat. No. 5,332,810). When a polymer is industrially produced, it is important that the initiator used in the production of the polymer does not show any change in properties such as the ability to initiate the polymerization after storage for a long time (storage stability) and that the initiator can be used at any time necessary The soluble lithium amide initiator described above, however, show inferior storage stability under some conditions. Because this initiator may be unstable in certain solvents, precipitates are formed after storage for only several days, and the ability to initiate the polymerization can disappear after storage for a month. Under some conditions when copolymerization, for example, copolymerization of styrene and butadiene, is initiated by this initiator, the polymer obtained sometimes has a higher molecular weight, a broader molecular weight distribution, a larger Mooney viscosity, and a higher tan $\delta$.

Still another such process is the polymerization of a conjugated diene in the presence of a solubilizing agent for the lithium amides, such as an ether or the like, by using the lithium amides prepared separately in advance as the initiator (Japanese Patent Application Laid Open Nos. 50-79590 and 54-22484). However, since the initiator in this process is also the pre-prepared lithium amides, the same problems as in the process described above, such as insolubility in solvents, poor storage stability and difficulty in handling can still occur. Even though the lithium amides show a tendency of being solubilized by the solubilizing agent present in the polymerization system, the performance of the lithium amides obtained by the processes can still be improved. Furthermore, because ether or the like is used as the solubilizing agent which is sometimes a component in the polymerization system, content of 1,2-linkage or 3,4-linkage in the diene polymer obtained is increased. Thus, another drawback of this process is that the microstructure of the poller cannot be varied as desired.

Still another such process is the homopolymerization and copolymerization of a conjugated diolefin and an aromatic vinyl compound, such as styrene and butadiene, wherein the molecular weight and the molecular weight distribution of pollers are controlled by adding a primary or a secondary amine to the polymerization system after the start of the polymerization (Japanese Patent Publication No. 48-17674).

However, the process described above does not clearly disclose the polymerization conversion which should reach at the time of the addition of the amine compound after the start of the polymerization. It is described in the specification that a polymer having a molecular weight distribution in which two peaks are found at a lower molecular weight side and at a higher molecular weight side is obtained when an amine compound is added at a polymerization conversion of about 25 to about 75%. In the examples, an amine compound is added at a polymerization conversion of 37.4 to 77.2%. This manner of addition of an amine compound is natural because the object of the addition of an amine compound in the patent described above is to control molecular weight and molecular weight distribution. Accordingly, a polymer having a low hysteresis loss often cannot be obtained by the process of the patent described above. In the present invention, it has been discovered that, when an amine compound is added to the polymerization system at a time when the polymerization conversion is very low or 0%, the polymer obtained exhibits a low hysteresis loss.

A process for preparing a telomer of a 1,3-diene by using butyllithium and a secondary amine is known although it is not a process for preparing a high molecular weight polymer (K. Takebe et al., Tetrahedron Letters, 1972, No. 39, page 4009) . This process is related to a process for preparing a telomer containing amine by bringing a large amount of a secondary amine and a small amount of a 1,3-diene into contact with a small amount of butyllithium to effect a continuous transfer reaction between low molecular weight diene lithium and the secondary amine according to the practice of organic synthesis. Thus, this process is entirely different from the process for preparing a polymer of high molecular weight which is the object of the present invention.

The known lithium amide compounds separately prepared in advance which are the initiators often have the property of being insoluble or hardly soluble in solvents because they are strong bases containing a hetero chemical elements. Therefore, these lithium amide compounds can sometimes have poor storage stability and the ability thereof as the initiator varies with the passage of time of storage. For example, when the lithium amides are prepared in a solvent by adding a small amount of an ether compound as a solubilizer into an insoluble solvent for the lithium amides, the solution can sometimes change to a suspended form with the passage of time so that the activity of the lithium amides decreases significantly, although the system is formed as a solution in the initial stage.

The present inventors have found that the above-described drawbacks are solved by a polymerization process in which a monomer is polymerized by using a soluble polymerization initiator prepared by contacting an organolithium compound with at least one secondary amine compound selected from the group of an amine compound and an imine compound having a specific structure in the presence of the monomer, and a patent application for the polymerization process was filed (Japanese Patent Application Laid-Open No. 6-199921).

The above-described method of preparing the polymer has advantages such that handling of the polymerization initiator is easy, the polymer obtained has a narrow molecular weight distribution, a reproducible molecular weight and microstructure, and the molecular weight is easily controlled, and the like.

SUMMARY OF THE INVENTION

Accordingly, a first object of the present invention is to provide a process for preparing a polymer by using an initiator which does not require any of processes for separately preparing an initiator in advance, facilities for preparing the initiator, facilities for storage and control of storage stability of the initiator, and which can easily be handled because of a high stability of the initiator component.

A second object of the present invention is to provide a process for preparing a polymer by using an initiator in which an effective concentration of an initiator formed from an initiator component is high in order to increase the initiation efficiency, the reproducibility of the concentration is high, and the evaluation of accurate concentration can be realized.

A third object of the present invention is to provide a process for preparing a polymer having a high molecular weight with a narrow molecular weight distribution which is controllable, the molecular weight and microstructure of the polymer being highly reproducible and to provide a process for preparing a polymer having an excellent coupling property, a high molecular weight and a low hysteresis loss property.

A fourth object of the present invention is to provide a process for preparing a polymer in which the polymer can be obtained with a high reproducibility and a stable quality even when the preparing process scale is changed to a large industrial scale.

All of the objects described above were achieved utilizing the process for preparing a polymer described below.

The process for preparing a high molecular weight polymer according to the present invention comprises polymerization of at least one monomer selected from the group consisting of conjugated diene monomers and vinylaromatic hydrocarbon monomers in a hydrocarbon solvent by using a lithium polymerization initiator which is formed by bringing the following compounds (1) and (2) into contact with each other in the polymerization system in the presence of at least one of said monomers, wherein said lithium polymerization initiator is a soluble polymerization initiator prepared by adding said compounds (1) and (2) into the polymerization system in order of (1) and (2):

(1) an organolithium compound; and
(2) at least one secondary amine compound selected from the group consisting of amine compounds expressed by the formula (A):

wherein $R^1$ and $R^2$ are, respectively, a hydrocarbon group having 1 to 20 carbon atoms selected from the group consisting of aliphatic hydrocarbon groups, alicyclic hydrocarbon groups and aromatic hydrocarbon groups and may be the same or different from each other, and imine compounds expressed by the formula (B:

wherein X is a group forming a cyclic structure with the nitrogen atom and is selected from the group consisting of (X-I) saturated type cyclic structure groups comprising $(CR^3R^4)_n$, (X-II) saturated type cyclic structure groups comprising $(CR^5R^6)_m$ and $NR^7$ or O, and X-III) cyclic structure groups having a molecular structure which ms derived from a structure group selected from the saturated type cyclic structure groups X-I and X-II by converting at least a part of carbon-carbon single bonds thereof into a carbon-carbon double bond, $R^3, R^4, R^5$ and $R^6$ are, respectively, a hydrogen atom or a hydrocarbon group having 1 to 10 carbon atoms selected from the group consisting of aliphatic hydrocarbon groups, alicyclic hydrocarbon groups and aromatic hydrocarbon groups, $R^7$ is a hydrocarbon group having 1 to 10 carbon atoms selected from the group consisting of aliphatic hydrocarbon groups, alicyclic hydrocarbon groups and aromatic hydrocarbon groups, $R^3, R^4, R^5, R^6$ and $R^7$ may be the same or different from each other, n is an integer of 3 to 20 and m is an integer of 2 to 9.

Other and further objects, features and advantages of the present invention will appear more fully from the following description.

DETAILED DESCRIPTION OF THE INVENTION

The present inventors extensively studied lithium amide polymerization initiators, raw materials thereof, reaction activities of end groups of anion polymerization, physical properties of a resultant polymer, and the forming process of a D polymerization initiator. The present inventors studied a case in which an organolithium compound and a secondary amine compound are brought into contact with each other in the presence of butadiene monomer, styrene monomer or the like in the polymerization system (in situ), the secondary amine compound is added to the polymerization system first, and thereafter, the organolithium compound is added thereto with an interval which is inevitably required for large scale production in an industrial production process. In such a case, the ratio of high molecular weight polymer having a secondary amino group at the polymerization initiation end of the polymer chain (modification efficiency with secondary amino group) is very low in the resulting polymer and the low hysteresis loss property of the polymer is poor. The present inventors further found that when the organo lithium compound is brought into contact with the secondary amine compound, the organolithium compound is added to the polymerization system first, and thereafter the secondary amine compound is added thereto to perform polymerization so that the polymerization reaction proceeds smoothly by the formed initiator and the resultant polymer is controlled in a narrow molecular weight distribution, and a polymer having a high modification efficiency with secondary amino group, a highly reproducible molecular weight and microstructure, a high coupling characteristic, a high molecular weight, and a low hysteresis loss property can be easily obtained. In accordance with the present invention, a polymer having a consistent quality can be obtained with high reproducibility, even if the production scale thereof is changed.

The organolithium compound used in the preparation process in the present invention includes all generally known organolithium compounds and is not particularly limited. Examples of the organolithium compound are: alkyllithiums, such as methyllithium, ethyllithium, propyllithium, n-butyllithium, sec-butyllithium, tert-butyllithium, n-hexyllithium and n-octyllithium; aryllithiums, such as phenyllithium, tolyllithium and lithium naphthylide; alkenyllithiums, such as vinyllithium and propenyllithium; and alkylenedilithiums, such as tetramethylenedilithium, pentamethylenedilithium, hexamethylenedilithium and decamethylenedilithium.

The amount of the organolithium compound is decided according to the desired molecular weight of the polymer and generally is used in the range of 0.05 to 15 m mole, preferably in the range of 0.1 to 10 m mole, based on 100 g of the monomer. When the amount is more than 15 m mole, it is difficult to obtain a high molecular weight polymer. When the amount is less than 0.05 m mole, occasionally the organolithium compound is deactivated by impurities in the polymerization system and the polymerization does not proceed. Thus, amounts outside of the range specified above are not preferable.

The secondary amine compound which is added to the polymerization system after the addition of the organolithium compound in the preparation process in the present invention is at least one compound selected from the group consisting of amine compounds expressed by the formula (A) described above and imine compounds expressed by the formula (B) described above.

As the amine compound expressed by the formula (A) described above, an amine compound in which $R^1$ and $R^2$ are, respectively, a hydrocarbon group having 1 to 10 carbon atoms selected from the group consisting of aliphatic hydrocarbon groups, alicyclic hydrocarbon groups and aromatic hydrocarbon groups, is preferable. Examples of such amine compound are dimethylamine, diethylamine, dipropylamine, di-n-butylamine diisobutylamine, dipentylamine, dihexylamine, diheptylamine, dioctylamine, diallylamine, dicyclohexylamine, N,N-butylisopropylamine, dibenzylamine, N,N-methylbenzylamine, N,N-methylhexylamine and N,N-ethylhexylamine. Among them, an amine compound in which $R^1$ and $R^2$ are, respectively, an aliphatic hydrocarbon group having 1 to 10 carbon atoms, is more preferable.

As the imine compound expressed by the formula (B) in which X is X-I in the formula (B), an imine compound in which $R^3$ and $R^4$ are, respectively, a hydrogen atom or an aliphatic hydrocarbon group having 1 to 8 carbon atoms and n is an integer of 3 to about 15 is preferable. Examples of the imine compound are trimethyleneimine, pyrrolidine, piperidine, 2-methylpiperidine, 3-methylpiperidine, 4-methylpiperidine, 3,5-dimethylpiperidine, 2-ethylpiperidine, hexamethyleneimine, heptamethyleneimine and dodecamethyleneimine. Among them, an imine compound in which $R^3$ and $R^4$ are, respectively, a hydrogen atom or an aliphatic hydrocarbon group having 1 to 5 carbon atoms and n is an integer of 3 to 12, is more preferable. Among these compounds, hexamethyleneimine and pyrrolidine are most preferable.

As the imine compound expressed by the formula (B) in which X is X-II in the formula (B), an imine compound in which $R^5$ and $R^6$ are, respectively, a hydrogen atom or an aliphatic hydrocarbon group having 1 to 5 carbon atoms, $R^7$ is an aliphatic hydrocarbon group having 1 to 5 carbon atoms and m is an integer of 3 to 5, is preferable. Examples of such imine compound are morpholine, N-methylpiperazine, N-ethylpiperazine, N-methylimidazolidine and N-ethylimidazolidine. Among them, an imine compound in which $R^5$ and $R^6$ are, respectively, a hydrogen atom, $R^7$ is an aliphatic hydrocarbon group having 1 to 5 carbon atoms and m is an integer of 3 to 5, is more preferable.

As the imine compound expressed by the formula (B) in which X is X-III in the formula (B), an imine compound having a structure group derived from a structure group selected from the preferable structure groups X-I and X-II described above by converting at least a part of carbon-carbon single bonds in the ring forming part thereof into a carbon-carbon double bond is preferable. Examples of such imine compound are 1, 2, 3, 6-tetrahydropyridine, oxazine, pyrroline, pyrrole and azepine. Among them, 1, 2, 3, 6-tetrahydropyridine is preferable.

The amount of the secondary amine used in the preparation process in the present invention is preferably in the range of 0.1 to 2.0 mole equivalent, based on 1 mole equivalent of the organolithium compound. For achieving a high coupling efficiency and a low hysteresis loss of the polymer obtained by addition of a coupling agent or the like to the polymerization system after finishing the polymerization, the secondary amine is used in an amount in the range of 0.2 to 1.5 mole equivalent, more preferably, in the range of 0.5 to 1.0 mol equivalent.

When the amount of the secondary amine is lower, the modification efficiency with secondary amino group becomes lower and the physical properties of the polymer obtained, such as hysteresis loss becomes insufficient. When the amount of the secondary amine is higher, the amount of oligomers containing amine which do not contribute to achieve better physical properties of the polymer increases, and an active lithium at the chain end of the polymer is chain transferred to the oligomer and the coupling efficiency decreases by the deactivation of the lithium at the chain end so that the hysteresis loss of the polymer obtained becomes insufficient.

The monomer used in the method according to the present invention is at least one monomer selected from conjugated dienes and vinylaromatic hydrocarbons. Examples of the conjugated diene are 1,3-butadiene, isoprene, 1,3-pentadiene, 2,3-dimethylbutadiene, 2-phenyl-1,3-butadiene and 1,3-hexadiene. 1,3-butadiene is preferable among them. Examples of the vinylaromatic hydrocarbon are styrene, α-methylstyrene, 1-vinylnaphthalene, 3-vinyltoluene, ethylvinylbenzene, divinylbenzene, 4-cyclohexylstyrene and 2,4,6-trimethylstyrene. Styrene is preferable among them. When copolymerization is conducted by using a conjugated diene and a vinylaromatic hydrocarbon, it is particularly preferable that 1,3-butadiene and styrene are used as the respective monomers.

Concentration of the monomer in a solvent is generally in the range of 5 to 50% by weight and preferably in the range of 10 to 30% by weight. In the copolymerization of a conjugated diene and a vinylaromatic hydrocarbon, content of the vinylaromatic hydrocarbon in the charged monomer mixture is in the range of 3 to 50% by weight and preferably in the range of 5 to 45% by weight.

In the preparation process in the present invention, a compound, such as diethylether, is not necessarily required for the purpose of solubilization and the increase of reactivity of the polymerization initiator itself. However, a randomizer is favorably used for the purpose of obtaining a polymer having a desired molecular structure. The randomizer used herein is a compound having the function of controlling the microstructure of the conjugated diene polymer, such as increasing the content of 1,2-linkage in a butadiene polymer or in the butadiene part of a butadiene-styrene copolymer and increasing the content of 3,4-linkage in a isoprene polymer, or controlling composition and distribution of monomer units in a conjugated diene-vinyl aromatic hydrocarbon copolymer, such as randomization of the butadiene unit and the styrene unit in a butadiene-styrene copolymer. When the randomizer is used in the method according to the present invention, it is preferable that the randomizer is added after the addition of the secondary amine compound to the polymerization system in light of the physical properties of the polymer obtained. The randomizer is not particularly limited in the present invention and includes all compounds generally used as the randomizer. Examples of the randomizer used are:

(1) ethers,
(2) orthodimethoxybenzenes,
(3) complex compounds of an alkali metal and a ketone or a triester of phosphorous acid,
(4) compounds expressed by the following formulae:

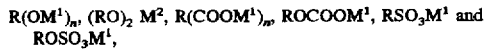

wherein R is a hydrocarbon group selected from the group consisting of aliphatic hydrocarbon groups, alicyclic hydrocarbon groups and aromatic hydrocarbon groups, $M^1$ is an alkali metal, specifically lithium, sodium, potassium, rubidium or cesium, $M^2$ is an alkaline earth metal, specifically calcium or barium and n is an integer of 1 to 3, and (5) tertiary amine.

The randomizer is described more specifically in the following. The randomizer may be used singly or as a combination of two or more kinds.

Examples of (1) ether are 1,2-dimethoxyethane, 1,2-diethoxyethane, tetrahydrofuran, 2-methoxymethyltetrahydrofuran, diethyl ether and triethyleneglycol dimethyl ether.

Examples of (2) orthodimethoxybenzene are veratrole, isohomoveratrol and the like.

Examples of (3) complex compounds of an alkali metal and a ketone or a triester of phosphorous acid are complex compounds of lithium, sodium, potassium, rubidium or cesium with ketones, such as acetone, methyl ethyl ketone, diisopropyl ketone, benzophenone, acetophenone, dibenzylketone, fluorenone, xanthone, Michler's ketone and acetylacetone, or a triester of phosphorous acid, such as triethyl phosphite, trioctyl phosphite, tribenzyl phosphite and trinonyl phosphite.

The randomizers having the general formulae in (4) shown above are described in the following.

Examples of alkali metal salts or alkaline earth metal salts of an alcohol or a phenol expressed by the general formula $R(OM^1)_n$ or $(RO)_2M^2$ are lithium salts, sodium salts, potassium salts, rubidium salts, cesium salts, calcium salts and barium salts of methyl alcohol, ethyl alcohol, isopropyl alcohol, tert-butyl alcohol, tert-amyl alcohol, cyclohexyl alcohol, allyl alcohol, 2-butenyl alcohol, benzyl alcohol, phenol, catechol, resorcinol, hydroquinone, 1-naphthyl alcohol, p-nonylphenol and pyrogallol.

Examples of alkali metal salts of a carboxylic acid or an acidic ester of carbonic acid expressed by the general formula $R(COOM^1)_n$ or $ROCOOM^1$ are lithium salts, sodium salts, potassium salts, rubidium salts and cesium salts of isovaleric acid, lauric acid, palmitic acid, stearic acid, oleic acid, rhodinic acid, benzoic acid, pimelic acid, n-dodecyl acidic carbonate and phenyl acidic carbonate.

Examples of alkali metal salts of a sulfonic acid or an ester of sulfuric acid expressed by the general formula $RSO_3M^1$ or $ROSO_3M^1$ are lithium salts, sodium salts, potassium salts, rubidium salts and cesium salts of dodecylbenzenesulfonic acid, diisopropylnaphthalenesulfonic acid, laurylamide of N-methyl-N-methanesulfonic acid salt, sulfuric acid ester salt of lauryl alcohol and caproylethyleneglycol sulfuric acid ester.

Examples of (5) tertiary amine are triethylamine and tetramethylethylenediamine.

The preferable randomizers among them are (1) ethers and (4) $R(OM^1)n$.

The randomizer is used in an amount in the range of 0.01 to 1000 mole equivalent based on 1 mole equivalent of the organolithium compound.

In the preparation process in the present invention, it is very important that the organolithium compound is added into the polymerization system in the presence of at least the monomer first, and thereafter, the secondary amine compound is added thereto so that the organolithium compound is brought into contact with the secondary amine compound. As long as the above-described condition is satisfied, other conditions such as the presence of a solvent are not particularly limited. Further, when the randomizer is added as occasion demands, as described above, in light the physical properties of the resultant polymer, the randomizer is preferably added to the polymerization system after the organolithium compound and the secondary amine have been added thereto. For example, it is preferable that the monomer, the solvent and the solution containing the organolithium compound are mixed together first, and thereafter, the secondary amine compound is added thereto, and then, the randomizer is added to the mixture.

Polymerization according to the preparation method in the present invention can be conducted at a desired temperature in the range of about $-80°$ to $150°$ C. and preferably at a temperature in the range of $-20°$ to $100°$ C. The polymerization can be conducted under the pressure generated in the reaction condition. It is preferable that the polymerization is carried out at a pressure sufficient for keeping the monomer substantially in a liquid phase. The pressure may vary with individual materials used for the polymerization, diluents used and the polymerization temperature. A higher pressure may be used, as occasion demands. The higher pressure can be obtained by increasing the pressure in the reactor by using a gas inert to the polymerization reaction or by other suitable methods.

It is also preferable that at least one secondary amine compound selected from the group consisting of the amine compounds expressed by the general formula (A) and imine compounds expressed by the general formula (B) is added to the polymerization system at the time when the polymerization conversion of the polymer is less than 5%, more preferably less than 2%, and most preferably less than 1%, in light of the physical properties of the polymer obtained. To this end, it is preferable that the polymerization reaction of the monomer is retarded during the period until the secondary amine compound is added. Accordingly, the temperature of the polymerization reaction of the monomer during the period until the secondary amine compound is added is preferably maintained at a temperature of $-10°$ to $30°$ C., more preferably $0°$ to $20°$ C., regardless of the above-described temperature. As described above, it is preferable that the temperature of the polymerization reaction is maintained at a lower temperature, and the randomizer is added after the secondary amine is added to the polymerization system in order to retard the polymerization reaction before the secondary amine compound is added.

In the preparation process in the present invention, any of bulk polymerization and solution polymerization can be adopted. Solution polymerization in a hydrocarbon solvent is preferable. The solvent is preferably in a liquid phase under the generally adopted condition of polymerization An aliphatic hydrocarbon, an alicyclic hydrocarbon or an aromatic hydrocarbon is used as the solvent. Preferable examples of the hydrocarbon solvent are propane, butane, pentane, hexane, heptane, isooctane, cyclopentane, cyclohexane, methylcyclohexane, decane, benzene and tetrahydronaphthalene. It is within the scope of the present invention to use two or more kinds of the solvents as a mixture.

It is generally preferred that water, oxygen, carbon dioxide and other catalyst poisons are removed from all of the materials related to the polymerization procedure, such as the initiator components, the solvent, the monomer and the like.

It is preferable that the modification efficiency (E) with the secondary amino group of the polymer obtained according to the present invention satisfies the following equation:

$$E = \frac{\text{High Molecular Weight Polymer having Secondary Amino Group at the End of Polymerization Initiation of the Polymer Chain}}{\text{Total Polymer}} \times 100 \geq 20 \text{ Weight \%}$$

The polymerization products of the present invention contain mainly (1) a high molecular weight polymer having a secondary amino group at the end of polymerization initiation of the polymer chain, (2) a high molecular weight polymer which does not have a secondary amino group at the end of polymer chain, and (3) oligomers having a secondary amino group at the end of the oligomer chain, and the like. The modification efficiency (E) with secondary amino group means herein the ratio of (1) above to the total high molecular weight polymer. It is considered that the total high molecular weight polymer consists of mainly (1) and (2) above, and therefore, (E) can be expressed by the equation:

$$E = \frac{(1) \text{ by Weight}}{[(1) + (2)] \text{ by Weight}} \times 100$$

As described above, E is preferred to be more than 20 weight %. When E is less than 20 weight %, the polymer obtained is not different from the polymer obtained when the secondary amine is not added to the polymerization system.

The modification efficiency with the secondary amino group at the end of polymerization initiation of the polymer chain can be determined by Kjeldahl method and a method for dying the polymer with Patent Blue according to Lawson et. al., which is described hereinafter in Examples of the present invention.

In the polymerization reaction according to the preparation process in the present invention, the active lithium is present at the end of the polymer as in the case of a general anionic living propagation reaction by an organolithium compound when a suitable molar ratio of the secondary amine to the organolithium compound is selected. Therefore, the polymer can be modified by adding a coupling agent and/or an electrophilic agent after the polymerization reaction was finished. Examples of the coupling agent are: halogenated tin compounds, such as tin tetrachloride, methyltin trichloride, dibutyltin dichloride and tributyltin chloride; allyltin compounds, such as tetraallyltin, diethyldiallyltin and tetra(2-octenyl)tin; other tin compounds, such as tetraphenyltin and tetrabenzyltin; silicon compounds, such as silicon tetrachloride, silicon tetrabromide, methylsilicon trichloride, dimethylsilicon dichloride and trimethylsilicon chloride; alkoxysilicon compounds, such as tetraphenoxysilicon and tetraethoxysilicon; and germanium compounds, such as germanium tetrachloride. Examples of the electrophilic compound are: amides, such as N-methylpyrrolidone, N,N'-dimethylimidazolidinone and N,N-dimethylformamide; esters, such as diethyl phthalate and butyl acetate; ketones, such as benzophenone, Michler's ketone and chalcone; oxiranes, such as ethylene oxide and styrene oxide; isocyanates, such as phenyl isocyanate and methylenebisphenyl isocyanate; and carbon dioxide($CO_2$). The preferable coupling agents among those described above are halogenated tin compounds such as tin tetrachloride and dibutyl tin dichloride, and halogenated silicon compounds such as silicon tetrachloride and dimethylsilicon dichloride. The more preferable coupling agents among those described above are halogenated tin compounds in light of modification efficiency. The preferable electrophilic agents among those described above are amides and isocyanates.

At the time when the polymerization is completed and before the coupling is carried out, number average molecular weight of the polymer is in the range of $8 \times 10^3$ to $1 \times 10^6$ and preferably in the range of $5 \times 10^4$ to $8 \times 10^5$, because the polymer obtained is used for rubber materials, resin materials and the like. When the molecular weight is lower than $8 \times 10^3$ or higher than $1 \times 10^6$, the effectiveness of the physical properties of the polymer in the present invention is not sufficiently exhibited, and therefore the ranges outside of the above ranges are not preferable. The molecular weight is easily adjusted because it is independent of the amount of the secondary amine and dependent on the amount of the organolithium compound.

The rubbery polymer prepared according to the present invention is a vulcanizable rubber and can be advantageously applied to the manufacture of automobile tire materials such as tire tread, under tread, carcass, sidewall and bead portion; and gaskets, sheets, belts, window frames, footwear, rubber threads, antivibration rubber, packing and the like. In particular, the rubbery polymer is suitable for tire tread rubber. A copolymer containing a large amount of vinylaromatic hydrocarbon can be used as a resin and applied to shoe soles, floor tiles adhesive compositions and various kinds of molded articles.

As described above, it has been found that the physical properties of the polymers obtained are significantly different from each other when a monomer is polymerized by using lithium initiators which are formed by different adding procedures of the organolithium compound and the secondary amine compound.

The polymerization mechanism is not clear, but it can be inferred as follows:

For the convenience of explanation, butyllithium as an organolithium compound is expressed by BuLi, the secondary amine compound is expressed by $R_2NH$, a lithium initiator formed is expressed by $R_2NLi$, and butadiene as a monomer is expressed by Bd. The amounts of addition of BuLi and $R_2NH$ are assumed to be 10 moles, respectively (molar ratio is 1.0). The polymerization mechanism will be described hereinafter with reference to the reaction equations.

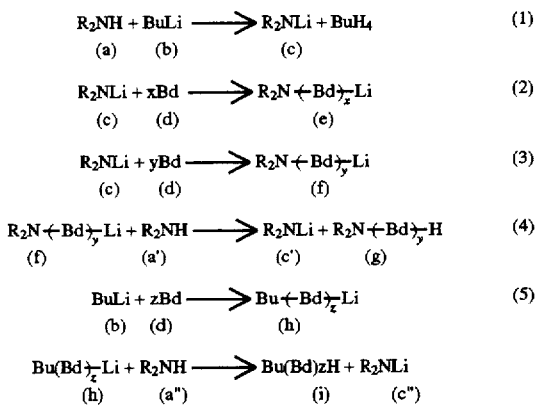

wherein each of x, y and z is an integer, and x is much greater than y and x is much greater than z.

In the present invention, firstly, BuLi (b) is added to the monomer solution, and secondly, $R_2NH$ (a) is added thereto so that the both compounds are brought into contact with each other to form the initiator $R_2NLi$(c) as shown by the reaction equation (1) above, and the monomer Bd (d) is polymerized by the resulting initiator (c) as shown by the reaction equation (2).

In the above reactions, even if a certain period of time for adding 10 moles of compound (a) is required after 10 moles of compound (b) is added, most of compound (b) forms about 10 moles of the initiator (c) according to the reaction (1), although a small amount of low molecular weight polybutadiene is formed by the polymerization reaction according to the equation (5). That is, the initiator (c) is effectively formed with a high concentration, and the living polymerization reaction expressed by the equation (2) takes place. Accordingly, the resultant polymerization product contains the polymer (e) having a secondary amino group in a large amount, and has a high modification efficiency with secondary amino group. The polymer has an active lithium at one end of the polymer so that a coupling reaction can easily take place with a modification agent such as tin tetrachloride, if necessary.

When the molar ratio (a)/(b) is less than 1, i.e., compound b) is in excess, the reaction (5) with compound (b) takes place in parallel. Consequently, the modification efficiency with secondary amino group expressed by the above described equation (E) decreases.

On the other hand, when the molar ratio (a)/(b) is more than 1, i.e., compound (a) is in excess, reactions expressed by the equation (4) and (3) are repeated as long as the excess compound (a) remains, and butadiene oligomer (g) containing amine is accumulated. After the excess compound (a) has completely been consumed, the living polymerization reaction with compound (c) proceeds in accordance with equation (2). In this instance, the mole concentration of compound (c) which depends on the concentration of compound (b) is not changed, so that a polymer having an expected molecular weight can be obtained. However, it is not preferable that a large amount of compound (g) is mixed with in the polymer. If a large amount of compound (g) is mixed with the polymer, the properties of the resultant polymer mixture deteriorate. Accordingly, the molar ratio (a)/(b) has an upper limit and a lower limit.

In the polymerization system in accordance with the present invention, no insoluble product is formed and the polymerization reaction proceeds rapidly and homogeneously by the soluble polymerization initiator from the beginning of the polymerization. The molecule of the resulting polymer thus obtained has a secondary amino group at the polymerization initiation end of the polymer chain and it has been confirmed that the coupling reaction takes place effectively Accordingly, it can be concluded that the lithium polymerization initiator of the present invention is a soluble polymerization initiator which is considered to be R2NLi formed by the contact of the organolithium compound and the secondary amine compound.

The polymerization initiator in the present invention is different from a conventional insoluble lithium amide initiator separately prepared in advance, and is formed in the polymerization system, and further, unfavorable chain transfer reaction is retarded so that every process control in preparing and storing the polymerization initiator and the like can be eliminated. Because the initiator of the present invention is soluble, the initiation efficiency is high. Further, the reproducibility of polymerization is excellent so that the molecular structure of the polymer obtained can be controlled as desired and the reproducibility thereof is excellent. Furthermore, the modification efficiency with secondary amino group and the coupling efficiency are high. Moreover, the polymer obtained has a high molecular weight and the physical properties such as low hysteresis loss and the like of the polymer are remarkably high.

The reason why the molecular weight of the polymer of the present invention is solely dependent on the amount of the organolithium compound regardless of the amount of the secondary amine compound, is believed to be that the soluble and almost homogeneous active species of presumably $R_2NLi$, the number of which is dependent on the amount of introduced organolithium, functions as the initiator of the living type. This means that, although the amount of oligomer (g) containing amine is increased when the secondary amine compound is present in excess , as long as the active lithium is present in some form, $R_2NLi$ is formed in a high concentration by the reaction between the active lithium and the amine during the short initial period of the polymerization, $R_2NLi$ is formed as the result in an amount which is determined by the amount of the introduced organolithium. This $R_2NLi$ is believed to function as the initiator and thus the polymer having high molecular weight and a narrow molecular weight distribution is formed.

The reason why the narrow molecular weight distribution of the obtained polymer is independent of the excess amount of amine is similar to the above described reason. In general, if the rate of the chain transfer reaction is sufficiently fast during the chain propagation period of the polymerization, the molecular weight distribution of the resultant polymer is remarkably large in comparison with that of the polymer obtained by usual living polymerization. As described above, in the polymerization process of the present invention, the excess amount of the free secondary amine, which promotes a chain transfer reaction, is believed to be consumed completely during the initiation period of polymerization. Thus, in the polymerization process of the present invention, almost no chain transfer reaction takes place during the chain propagation period, and the molecular weight distribution of the resulting polymer can be simply determined by the balance of propagation rate and initiation rate as in usual living polymerization.

Next, suppose that $R_2NH$ (a) is added to the polymerization system first, and thereafter BuLi (b) is added thereto during a certain period of time so that the both compounds are brought into contact with each other to carry out polymerization of monomer Bd (d). In this instance, 10 moles of compound (a) is added to the polymerization system and subsequently 10 moles of compound (b) is added thereto. Since it takes some time for adding the compounds (b), suppose the time when 1 mole of compound (b) is added. At this time, 1 mole of compound (c) is formed by 1 mole of compound (a) and 1 mole of compound (b) by the reaction according to the above equation (1). At the initial stage of the polymerization reaction according to the above equation (2) with the obtained initiator (c), i.e., at the oligomerization stage of the equation (3), 1 mole of the oligomer (f) reacts with 1 mole of compound (a') of 9 mole of unreacted compound (a) to form 1 mole of compound (c') and 1 mole of compound (g). Further, after the oligomerization according to equation (3) by the reaction of compound (C') and Bd(d), the resultant olygomer(f) reacts with 1 mole of compound (a') of 8 mole of unreacted compound (a) to form 1 mole compound (c') and 1 mole of compound (g). Thus, as long as unreacted compound (a) is present, reactions according to the equations (3 and (4) are repeated so that butadiene oligomer (g) containing amine is accummlated. After all excess compounds (a) are completely consumed, the living polymerization reaction proceeds according to the equation (2). In formulas (1) through (5), the rate of reaction of the various Li materials and amines is greater than the rate of the polymerization reaction initiated by the Li materials.

However, since compound (b) is added continuously in fact, the added compound (b) affects the degree of reactions expressed by the equations (2), (3) and (4), depending on the degree of the reaction of the equation (1) in which compound (b) takes part. Compound (a) is consumed to form compound (g) so that compound (a) to react with compound (b) becomes insufficient, and at the final stage of addition of compound (b), the amount of compound (b) becomes in excess. The polymerization reaction according to the equation (5) takes place by the excess compound (b). The resultant polymer finally contains the polymer (e) having a secondary amino group in accordance with the polymerization reaction (2) and the polymer (h) which does not have a secondary amino group in accordance with the polymerization reaction (5). This means that the modification efficiency with secondary amino group of the resulting polymer is low. In this case, it is considered to be difficult to obtain the polymer having a high modification efficiency with secondary amino group, regardless of either the molar ratio (a)/(b) is more than 1 or less than 1, as long as the above-described reactions take place.

EXAMPLES

The following examples are submitted for the purpose of further illustrating the nature of the present invention and should not be regarded as a limitation on the scope thereof.

Measurements were carried out according to the following methods.

Number average molecular weight (Mn) and molecular weight distribution (Mw/Mn) of the polymer were measured by gel permeation chromatography (GPC, HLC-8020, produced by Toso Co., Ltd.; column, GMH-XL, two columns in series, produced by Toso Co., Ltd.) and Mn and Mw/Mn were calibrated in terms of polystyrene with use of monodisperse polystyrene by the differential refractive index (RI).

Coupling efficiency was measured when a coupling agent was added after polymerization had finished. The coupling efficiency was obtained from the ratio of the area of the high molecular weight fraction and the area of the low molecular weight fraction in the measured curve of GPC.

The amount of 1, 2 linkage of the butadiene part in the polymer and the microstructure of the butadiene part of the butadiene-styrene copolymer were obtained by an infrared method (D. Morero et. al., Chem. Ind., 41,758(1959)). The content of bound styrene was obtained from the calibration curve of an infrared measurement method based on the absorption of phenyl group at 699 $cm^{-1}$.

The modification efficiency with secondary amino group at the end of polymerization initiation of polymers in Examples was determined by the method according to Lawson et. al. Namely, 0.08 g of Patent Blue VF and 1 liter of 0.01 N aqueous hydrochloric acid were mixed to prepare a dying solution. Further, the absolute molecular weight of polymers obtained in Examples was measured and trichloromethane ($CHCl_3$) solutions of the polymers (solutions in the range of 0.15 to 0.4 weight %, the concentrations thereof being exactly determined) were prepared as samples. 10 ml of the dying solution and 10 ml of each of the polymer samples were mixed and shaken for 2.5 hours at room temperature. After the mixture was allowed to stand for 2 hours, an organic solvent layer was extracted and the visible ray absorption intensity thereof at 628 nm was measured. Trichloromethane solutions having different concentrations of N-dodeca-hexamethyleneimine were prepared and the ultra-violet ray absorption intensity thereof was measured to obtain a calibration curve. By using this calibration curve, the concentration of secondary amino group in each of polymer samples was determined. The modification efficiency with secondary amino group was calculated based on the molar concentration of the polymer in each the polymer sample and the concentration of the above-described secondary amino group.

As the index of hysteresis loss, tan δ was used. When tan δ was lower, the hysteresis loss was evaluated to be lower. Measurement of tan δ was conducted by using a viscoelasticity measurement apparatus (RVE; a product of Rheometrix Co.) at the temperature of 50° C. at the strain of 1% and at the frequency of 15 Hz. All materials used in Examples and Comparative Examples were dehydrated and purified.

[Example 1]

A 5 liter autoclave which was dried and purged with nitrogen was charged with 2100 g of cyclohexane, 320 g of butadiene monomer and 80 g of styrene monomer, and the temperature thereof was maintained at 10° C., and thereafter, 2.5 ml of 1.6N n-butyllithium (hereinafter abbreviated as BuLi) was added over a 15-minute period. Immediately after this, 0.29 g of hexamethyleneimine (hereinafter abbreviated as HMI; molar equivalent ratio to lithium: 1.0) and 20.2 g of tetrahydrofuran (hereinafter abbreviated as THF; molar equivalent ratio to lithium: 70) were added in this order, and polymerization was conducted for 60 minutes, as shown in Table 1. Immediately after the addition of HMI, 200 ml of the content was taken out to examine the polymerization conversion rate. During the above-described process, the temperature within the autoclave raised to 85° C. The polymerization system showed no precipitate at all and was homogeneous and clear throughout the period from the start to the end of the polymerization. The polymerization conversion rate was approximately 100%.

A part of the polymerization solution was taken as a sample. Isopropyl alcohol was added to the sample solution and solid product obtained was dried to obtain a rubbery copolymer. The microstructure, molecular weight and molecular weight distribution of the polymer were measured with this copolymer. The formulations of polymerization are shown in Table 1 and the results obtained are shown in Table 2, respectively.

At the same time of the measurements, the presence of low molecular weight components in the polymerization system was examined, but no low molecular weight components which may be produced before the secondary amine was added was observed. The modification efficiency with secondary amino group of the resultant polymer determined in accordance with the above-described method was 90%.

Tin tetrachloride serving as the coupling agent was added to the polymerization solution obtained above in an amount of equal molar equivalent to the active lithium atom at the polymer chain end in terms of chlorine atom, and modification reaction was carried out at 70° C. for 30 minutes. This solution was added to isopropyl alcohol and the solid product obtained by stirring the solution was dried to obtain a rubbery copolymer. Coupling efficiency was measured with this copolymer. The results are shown in Table 2.

By using the copolymer after the coupling, a composition prepared according to the formulation shown in Table 3 was cured at 145° C. for 33 minutes. Tan δ of a vulcanizate obtained was measured, and the value of tan δ was 0.075.

[Comparative Example 1]

This example shows polymerization in which compounds relating to the polymerization initiator were added in a different order from that of Example 1.

Polymerization was conducted by the same process as that in Example 1 in which BuLi was added over a 15-minute period except that the order of adding compounds relating to the polymerization initiator was changed in such a manner that HMI, THF and BuLi (1.6N; 2.5 ml) were added in this order to obtain a copolymer. During this process, the temperature within the autoclave raised to 85° C. The polymerization system showed no precipitate at all and was homogeneous and clear throughout the period from the start to the end of the polymerization. The polymerization conversion rate was approximately 100%. Coupling modification was carried out in a similar manner as that of Example 1. Microstructure, molecular weight, molecular weight distribution and the coupling efficiency after the modification were measured with this copolymer in a similar manner as those of Example 1. The formulations of polymerization are shown in Table 1 and the results are shown in Table 2, respectively.

The viscoelasticity of a valcanizate obtained in a similar manner as Example 1 was measured and tan δ was 0.113.

[Comparative Example 2]

This example shows polymerization using lithium amide separately prepared in advance.

A 500 ml pressure resistant glass vessel which was dried and purged with nitrogen was charged with 37 ml of cyclohexane and 1.0 g of HMI. To this solution, 63 ml of a 1.6N hexane solution of BuLi was added dropwise with stirring over a 15-minute period at room temperature, and N-lithium hexamethyleneimide hereinafter abbreviated as LHMI) solution was obtained. Yield was approximately 100%. Insoluble fractions were precipitated out of the reaction solution with the passage of time and the reaction solution turned into a suspension.

A 5 liter autoclave which was dried and purged with nitrogen was charged with 2100 g of cyclohexane, 320 g of butadiene monomer , 80 g of styrene monomer and 20.2 g of THF, and the temperature thereof was maintained at 10° C. To this solution, 4.0 ml of 1.0N LHMI which was prepared in advance by the above-described process and allowed to stand for 7 days after preparation, was added over a 15-minute period. Polymerization reaction was conducted for 60 minutes to obtain a copolymer. During the above-described process, the temperature within the autoclave raised to 85° C. The polymerization system was somewhat unclear and heterogeneous at the initial stage of the process, but showed no precipitate at all and was homogeneous and clear at the end of the polymerization. The polymerization conversion rate was approximately 100%. Coupling modification was carried out in a similar manner as that of Example 1. Microstructure, molecular weight, molecular weight distribution and the coupling efficiency after the modification were measured with this copolymer in a similar manner as those of Example 1. The formulations of polymerization are shown in Table 1 and the results are shown in Table 2, respectively. The viscoelasticity of a valcanizate obtained in a similar manner as Example 1 was measured and tan δ was 0.100.

[Comparative Example 3]

This example shows polymerization using butyl lithium as an initiator.

Polymerization was conducted by the same process as that in Example 1 except that a secondary amine compound was not used to obtain a copolymer. During this process, the temperature in the autoclave raised to 85° C. The polymerization system showed no precipitate at all and was homogeneous and clear throughout the period from the start to the end of the polymerization. The polymerization conversion rate was approximately 100%. Coupling modification was carried out in a similar manner as that in Example 1. Microstructure, molecular weight, molecular weight distribution and the coupling efficiency after the modification were measured with this copolymer in a similar manner as those in Example 1. The formulations of polymerization are shown in Table 1 and the results are shown in Table 2, respectively.

The viscoelasticity of a valcanizate obtained in a similar manner as Example 1 was measured and tan a obtained was 0.125.

[Comparative Example 4]

This example shows polymerization using butyl lithium as an initiator.

Polymerization was conducted by the same process as that in Example 1 except that 20.2 g of THF and 2.5 ml of 1.6N BuLi were added in this order without using a secondary amine compound to obtain a copolymer. During this process, the temperature in the autoclave raised to 85° C. The polymerization system showed no precipitate at all and was homogeneous and clear throughout the period from the start to the end of the polymerization. The polymerization conversion was approximately 100%. Coupling modification was carried out in a similar manner as that in Example 1.

Microstructure, molecular weight, molecular weight distribution and the coupling efficiency after the modification were measured with this copolymer in a similar manner as those in Example 1. The formulations of polymerization are shown in Table 1 and the results are shown in Table 2, respectively.

The viscoelasticity of a valcanizate obtained in a similar manner as Example 1 was measured and tan δ obtained was 0.125.

[Example 2]

This example shows polymerization using pyrrolidine as a secondary amine compound.

Polymerization was conducted by the same process as that in Example 1 except that 0.28 g of pyrrolidine (molar equivalent ratio to lithium: 1.0) was used instead of HMI to obtain a copolymer. During this process, the temperature within the autoclave raised to 85° C. The polymerization system showed no precipitate at all and was homogeneous and clear throughout the period from the start to the end of the polymerization. The polymerization conversion rate was approximately 100%. The modification efficiency with secondary amino group was 88%. The coupling modification was carried out in a similar manner as that in Example 1. Microstructure, molecular weight, molecular weight distribution and the coupling efficiency after the modification were measured with this copolymer in a similar manner as those in Example 1. The formulations of polymerization are shown in Table 1 and the results are shown in Table 2, respectively.

The viscoelasticity of a valcanizate obtained in a similar manner as Example 1 was measured and the value of tan δ obtained was 0.083.

[Comparative Example 5]

This example shows polymerization using pyrrolidine as a secondary amine compound.

Polymerization was conducted by the same process as that in Example 1 in which BiLi was added to the polymerization system over a 15-minute period, etc., except that the order of addition of compounds relating to the polymerization initiator was changed in such a manner that 0.28 g of pyrrolidine, 20.2 g of THF and 2.5 ml of 1.6N BuLi were added in this order to obtain a copolymer. During this process, the temperature within the autoclave raised to 85° C. The polymerization system showed no precipitate at all and was homogeneous and clear throughout the period from the start to the end of the polymerization. The polymerization conversion rate was approximately 100%. Coupling modification was carried out in a similar manner as that in Example 1. Microstructure, molecular weight, molecular weight distribution and the coupling efficiency after the modification were measured with this copolymer in a similar manner as those in Example 1. The formulations of polymerization are shown in Table 1 and the results are shown in Table 2, respectively.

The viscoelasticity of a valcanizate obtained in a similar manner as Example 1 was measured and the value of tan δ obtained was 0.118.

[Example 3]

This example shows polymerization using 1, 2, 3, 6-tetrahydropyridine as a secondary amine compound.

Polymerization was conducted by the same process as that in Example 1 except that 0.33 g of 1, 2, 3, 6-tetrahydropyridine (molar equivalent ratio to lithium: 1.0) was used instead of HMI to obtain a copolymer. During this process, the temperature within the autoclave raised to 85° C. The polymerization system showed no precipitate at all and was homogeneous and clear throughout the period from the start to the end of the polymerization. The polymerization conversion rate was approximately 100%. The modification efficiency with secondary amino group was 82%. Coupling modification was carried out in a similar manner as that in Example 1. Microstructure, molecular weight, molecular weight distribution and the coupling efficiency after the modification were measured with this copolymer in a similar manner as those in Example 1. The formulations of polymerization are shown in Table 1 and the results are shown in Table 2, respectively.

The viscoelasticity of a valcanizate obtained in a similar manner as Example 1 was measured and the value of tan δ obtained was 0.078.

[Example 4]

This example shows polymerization in which potassium alkoxide was used as a randomizer and the styrene/butadiene ratio of the monomer was changed.

Polymerization was conducted by the same process as that in Example 1, except that 0.025 g of potassium t-amylate (molar equivalent ratio to lithium: 0.05) was used instead of THF, the styrene/butadiene ratio was changed, and polymerization was carried out for 120 minutes to obtain a copolymer. During this process, the temperature within the autoclave raised to 85° C. The polymerization system showed no precipitate at all and was homogeneous and clear throughout the period from the start to the end of the polymerization. Polymerization conversion was approximately 100%. The modification efficiency with secondary amino group was 82%. Coupling modification was carried out in a similar manner as that in Example 1. Microstructure, molecular weight, molecular weight distribution and the coupling efficiency after the modification were measured with this copolymer in a similar manner as those in Example 1. The formulations of polymerization are shown in Table 1 and the results are shown in Table 2, respectively.

The viscoelasticity of a valcanizate obtained in a similar manner as Example 1 was measured and the value of tan δ obtained was 0.110.

[Comparative Example 6]

This example shows polymerization using potassium alkoxide as a randomizer.

Polymerization was conducted by the same process as that in Example 4 in which BuLi was added over a 15-minute period, except that the order of addition of compounds relating to the polymerization initiator was changed in such a manner that 0.29 g of HMI, 0.025 g of potassium t-amylate and 2.5 ml of 1.6N BuLi were added in this order to obtain a copolymer. During this process, the temperature within the autoclave raised to 85° C. The polymerization system showed no precipitate at all and was homogeneous and clear throughout the period from the start to the end of the polymerization. The polymerization conversion rate was approximately 100%. Coupling modification was carried out in a similar manner as that in Example 1. Microstructure, molecular weight, molecular weight distribution and the coupling efficiency after the modification were measured with this copolymer in a similar manner as those in Example 1. The formulations of polymerization are shown in Table 1 and the results are shown in Table 2, respectively.

The viscoelasticity of a valcanizate obtained in a similar manner as Example 1 was measured and the value of tan δ obtained was 0.150.

[Example 5]

This example shows polymerization in which the polymerization system was allowed to stand at a low temperature after n-butylyllithium was added.

Polymerization was conducted by the same process as that in Example 1 except that after n-butylyllithium was added and the polymerization system was allowed to stand at 10° C. for 20minutes, HMI was added to obtain a copolymer. The polymerization system showed no precipitate at all and was homogeneous and clear throughout the period from the start to the end of the polymerization. The polymerization conversion rate was approximately 100%. The modification efficiency with secondary amino group was 87%. Coupling modification was carried out in a similar manner as that in Example 1. Microstructure, molecular weight, molecular weight distribution and the coupling efficiency after the modification were measured with this copolymer in a similar manner as those of Example 1. The formulations of polymerization are shown in Table 1 and the results are shown in Table 2, respectively.

The viscoelasticity of a valcanizate obtained in a similar manner as Example 1 was measured and tan δ obtained was 0.087.

[Example 6]

This example shows polymerization in which the temperature of the polymerization system was maintained at 25° C. after the monomer was added to the autoclave.

Polymerization was conducted by the same process as that in Example 1 except that the temperature of the polymerization system was maintained at 25° C. after the monomer was added to the autoclave to obtain a copolymer. The polymerization system showed no precipitate at all and was homogeneous and clear throughout the period from the start to the end of the polymerization. The polymerization conversion rate was approximately 100%. The modification efficiency with secondary amino group was 85%. Coupling modification was carried out in a similar manner as that in Example 1. Microstructure, molecular weight, molecular weight distribution and the coupling efficiency after the modification were measured with this copolymer in a similar manner as those of Example 1. The formulations of polymerization are shown in Table 1 and the results are shown in Table 2, respectively.

The viscoelasticity of a valcanizate obtained in a similar manner as Example 1 was measured and tan δ obtained was 0.080.

[Example 7]

This example shows polymerization in which the temperature of the polymerization system was maintained at 35° C. after the monomer was added to the autoclave.

Polymerization was conducted by the same process as that in Example 1 except that the temperature of the polymerization system was maintained at 35° C. after the monomer was added to the autoclave to obtain a copolymer. The polymerization system showed no precipitate at all and was homogeneous and clear throughout the period from the start to the end of the polymerization. The polymerization conversion rate was approximately 100%. The modification efficiency with secondary amino group was 86%. Coupling modification was carried out in a similar manner as that in Example 1. Microstructure, molecular weight, molecular weight distribution and the coupling efficiency after the modification were measured with this copolymer in a similar manner as those of Example 1. The formulations of polymerization are shown in Table 1 and the results are shown in Table 2, respectively.

The viscoelasticity of a valcanizate obtained in a similar manner as Example 1 was measured and tan δ obtained was 0.095.

TABLE 1

| Formulation of Polymerization | | | |
|---|---|---|---|
| | solvent | monomer | |
| | cyclo-hexane (g) | butadiene (g) | styrene (g) |
| Example 1 | 2100 | 320 | 80 |
| Comp. Example 1 | 2100 | 320 | 80 |
| Comp. Example 2 | 2100 | 320 | 80 |
| Comp. Example 3 | 2100 | 320 | 80 |
| Comp. Example 4 | 2100 | 320 | 80 |
| Example 2 | 2100 | 320 | 80 |
| Comp. Example 5 | 2100 | 320 | 80 |
| Example 3 | 2100 | 320 | 180 |
| Example 4 | 2100 | 240 | 160 |
| Comp. Example 6 | 2100 | 240 | 160 |
| Example 5 | 2100 | 320 | 80 |
| Example 6 | 2100 | 320 | 80 |
| Example 7 | 2100 | 320 | 80 |

| | secondary Amine compound | | randomizer | |
|---|---|---|---|---|
| | compound | molar equivalent ratio to Li | compound | molar equivalent ratio to Li |
| Example 1 | HMI*¹ | 1.0 | THF*⁵ | 70 |
| Comp. Example 1 | HMI | 1.0 | THF | 70 |
| Comp. Example 2 | LHMI*² | — | THF | 70 |
| Comp. Example 3 | — | — | THF | 70 |
| Comp. Example 4 | — | — | THF | 70 |
| Example 2 | PY*³ | 1.0 | THF | 70 |
| Comp. Example 5 | PY | 1.0 | THF | 70 |
| Example 3 | 1,2,3,6 THP*⁴ | 1.0 | THF | 70 |
| Example 4 | HMI | 0.5 | KOt-Am*⁶ | 0.05 |
| Comp. Example 6 | HMI | 0.5 | KOt-Am | 0.05 |
| Example 5 | HMI | 1.0 | THF | 70 |
| Example 6 | HMI | 1.0 | THF | 70 |
| Example 7 | HMI | 1.0 | THF | 70 |

| | order of addition of secondary amine compd. Randomizer, and initiator | | | temperature at the start of polymerization |
|---|---|---|---|---|
| Example 1 | BuLi*⁷ - | HMI - | THF | 10 |
| Comp. Example 1 | HMI - | THF - | BuLi | 10 |
| Comp. Example 2 | THF - | HMI | 10 | |
| Comp. Example 3 | BuLi | - | THF | 10 |
| Comp. Example 4 | THF | - | BuLi | 10 |
| Example 2 | BuLi - | PY - | THF | 10 |
| Comp. Example 5 | PY - | THF - | BuLi | 10 |
| Example 3 | BuLi - | THP*⁴ - | THF | 10 |
| Example 4 | BuLi - | HMI - | KOt-Am | 10 |
| Comp. Example 6 | HMI - | KOt-Am - | BuLi | 10 |
| Example 5 | BuLi - | HMI - | THF | 10*⁸ |
| Example 6 | BuLi - | HMI - | THF | 25 |
| Example 7 | BuLi - | HMI - | THF | 35 |

(Note)
*¹Hexamethyleneimine
*²Lithium hexamethyleneimide
*³Pyrrolidine
*⁴1,2,3,6-tetrahydropyridine

TABLE 1-continued

Formulation of Polymerization

*\*5Tetrahydrofran*
*\*6Potassium t-amylate*
*\*7Butyllithium*
*\*8Maintained at 10° C. for 20 minutes*

TABLE 2

Results of Polymerization

| | microstructure | | | | |
|---|---|---|---|---|---|
| | content of 1,2-linkage (% of total butadiene) | content of styrene (%) | polymerization conversion rate prior to adding secondary amine (%) | molecular weight Mn (×10$^5$) | molecular weight* Mw/Mn |
| Example 1 | 60 | 20 | 0 | 2.0 | 1.06 |
| Comp. Example 1 | 62 | 20 | — | 2.1 | 1.05 |
| Comp. Example 2 | 62 | 21 | — | 2.6 | 1.32 |
| Comp. Example 3 | 63 | 20 | — | 1.9 | 1.05 |
| Comp. Example 4 | 59 | 19 | — | 1.9 | 1.05 |
| Example 2 | 61 | 20 | 0.5 | 2.0 | 1.09 |
| Comp. Example 5 | 61 | 20 | — | 2.1 | 1.08 |
| Example 3 | 59 | 20 | 0.5 | 2.1 | 1.07 |
| Example 4 | 21 | 40 | 0 | 2.2 | 1.21 |
| Comp. Example 6 | 20 | 41 | — | 2.0 | 1.22 |
| Example 5 | 59 | 20 | 2 | 1.8 | 1.09 |
| Example 6 | 59 | 21 | 0.8 | 2.0 | 1.08 |
| Example 7 | 55 | 20 | 3 | 1.8 | 1.07 |

| | coupling efficiency (%) | tan δ |
|---|---|---|
| Example 1 | 82 | 0.075 |
| Comp. Example 1 | 75 | 0.113 |
| Comp. Example 2 | 62 | 0.100 |
| Comp. Example 3 | 86 | 0.125 |
| Comp. Example 4 | 89 | 0.125 |
| Example 2 | 78 | 0.083 |
| Comp. Example 5 | 81 | 0.118 |
| Example 3 | 80 | 0.078 |
| Example 4 | 80 | 0.110 |
| Comp. Example 6 | 78 | 0.150 |
| Example 5 | 79 | 0.087 |
| Example 6 | 78 | 0.080 |
| Example 7 | 75 | 0.095 |

(Note)
*Before coupling reaction

TABLE 3

Formulation for compounding

| | |
|---|---|
| copolymer | 100 parts (by weight) |
| HAF carbon black | 50 |
| aromatic oil | 10 |
| stearic acid | 2 |
| anti-aging agent 6C*$^1$ | 1 |
| zinc oxide | 3 |
| accelerator DPG*$^2$ | 0.5 |
| accelerator DM*$^3$ | 1.0 |
| sulfur | 1.5 |

(Note)
*$^1$N-(1,3-dimethybutyl)-N'-phenyl-p-phenylenediamine
*$^2$dipenylguanidine
*$^3$dibenzothiazyl disulfide As is clear from the above Table 2, in accordance with the process of the present invention, when the type of secondary amine was varied (Examples 1, 2 and 3), when the type of randomizer was varied (Example 4) or when the rate of polymerization conversion prior to addition of the secondary amine compound was varied (Examples 5, 6, and 7), the polymerization system was always clear and took the form of polymerization classified as the homogeneous type. The efficiency of initiation was large and stable living polymerization took place. As a result, excellent results could be obtained in that the molecular weight was well controlled, the molecular weight distribution was narrow and the coupling efficiency was high. In accordance with Examples of the present invention, polymers having a secondary amino group at the end of polymerization initiation of the polymer chain and having a molecular structure including, for example, tin-carbon bond by coupling reaction can easily be obtained, and the polymers thus obtained have excellent physical properties, such as low hysteresis loss and the like.

In contrast, Comparative Examples 1, 5 and 6 which were carried out in such a manner that as the procedure of addition of an organolithium compound and a secondary amine compound, the secondary amine compound was added to the polymerization system first, and thereafter, the organolithium compound was added thereto over a certain period of time which is inevitably required for the manufacturing process in the industrially large production scale. According to these processes, the polymers having narrow molecular distributions can be obtained, but the modification efficiency with secondary amino group is extremely low and it is difficult to obtain desirable low hysteresis loss, regardless of kinds of secondary amine compounds and randomizers.

In Comparative Example 2 in which lithium amide separately prepared in advance was used as an initiator, the lithium amide itself was substantially insoluble in solvents so that heterogeneous polymerization took place. Accordingly, the efficiency of initiation was low and active species for polymerization were unstable so that the molecular weight of the polymer could not be controlled, the molecular weight was increased, the molecular weight distribution was made broader, and further, the coupling efficiency was decreased.

Furthermore, when lithium amide separately prepared in advance is used as in Comparative Example 2 in an industrial large scale, there will be a problem that additional independent facilities for preparing the polymerization initiator are required.

In Comparative Examples 3 and 4 in which secondary amine compounds were not added, the low hysteresis loss effect was low, regardless of the order of addition of butyllithium and THF as a ramdomizer.

It will be clear that when tan δ of ordinary butadienestyrene random copolymers obtained by using BuLi and tan δ of copolymers obtained by changing method of addition of organolithium compounds and secondary amine compounds are examined by comparing Comparative Examples 1, 3, 4, 5 and 6 with Examples 1 to 6, the modification efficiency with secondary amino group and low hysteresis loss effect of the polymers obtained according to the method of the present invention are high, and these effects are largely enhanced when the polymerization conversion rate prior to addition of the secondary amine compound is retarded less than 1% as shown in Examples 1, 2, 3 and 6.

As described above, the foregoing possible polymerization mechanism can be supported by the facts that the physical properties of the polymers are varied with the methods of addition of the specific organolithium compounds and the secondary amine compounds when these compounds are brought into contact with each other.

The method of preparing polymers according to the present invention exhibits excellent effects as follows:

The polymerization initiator has the following advantages:

(1) process for separately preparing the initiator in advance, storage facilities of the initiator and control of stabilization of the initiator are not required;

(2) handling is easy because the initiator components are easily controlled in a stable condition; and (3) desired polymerization initiator can effectively be produced with a high concentration so that the initiation efficiency can be enhanced, a high reproducibility of the concentration of the initiator can be achieved, and further, the exact concentration of the initiator can be determined.

Furthermore, the polymer obtained has the following advantages:

(1) the molecular weight distribution of the polymer is narrow;

(2) the molecular weight and microstructure of the polymer are highly reproducible;

(3) the molecular weight of the polymer can easily be controlled by determining the concentration of the organolithium compound, regardless of the secondary amine compound;

(4) ratio of the high molecular weight polymer having secondary amino group at the end of polymerization initiation of the polymer chain (modification efficiency with secondary amino group) is high;

(5) modification can be made with a high coupling efficiency resulting from a high living property of the polymer;

(6) a high molecular weight polymer can be obtained; and (7) the polymer obtained exhibits excellent physical properties such as low hysteresis loss and the like.

Moreover, the method according to the present invention provides superior effects that the polymer obtained has a highly consistent product quality even when the scale of manufacturing the polymer is changed so as to industrialize the polymer on a large scale.

What is claimed is:

1. A process for preparing a high molecular weight polymer comprising polymerization of at least one monomer selected from the group consisting of conjugated diene monomers and vinylaromatic hydrocarbon monomers in a hydrocarbon solvent by using a lithium polymerization initiator which is formed by bringing the following compounds (1) and (2) into contact with each other in the polymerization system in the presence of at least one of said monomers, wherein said lithium polymerization initiator is a soluble polymerization initiator prepared by adding said compounds (1) and (2) into the polymerization system in order of (1) and (2):

(1) an organolithium compound; and (2) at least one imine compound expressed by the formula (B):

wherein X is a group forming a cyclic structure with the nitrogen atom and is selected from the group consisting of (X-I) saturated type cyclic structure groups comprising $(CR^3R^4)_n$, (X-II) saturated type cyclic structure groups comprising $(CR^5R^6)_m$ and $NR^7$ or O, and (X-III) cyclic structure groups having a molecular structure which is derived from a structure group selected from the saturated type cyclic structure groups X-I and X-II by converting at least a part of carbon-carbon single bonds thereof into a carbon-carbon double bond, $R^3$, $R^4$, $R^5$ and $R^6$ are, respectively, a hydrogen atom or a hydrocarbon group having 1 to 10 carbon atoms selected from the group consisting of aliphatic hydrocarbon groups, alicyclic hydrocarbon groups and aromatic hydrocarbon groups. $R^7$ is a hydrocarbon group having 1 to 10 carbon atoms selected from the group consisting of aliphatic hydrocarbon groups, alicyclic hydrocarbon groups and aromatic hydrocarbon groups, $R^3$, $R^4$, $R^5$, $R^6$ and $R^7$ may be the same or different from each other, n is an integer of 3 to 20 and m is an integer of 2 to 9, wherein at least one of coupling agents and electrophilic agents is added to the polymerization system after the polymerization has substantially been completed.

2. A process for preparing a polymer according to claim 1, wherein said at least one secondary amine compound is an imine compound expressed by the formula (B) is brought into contact with said organolithium compound when the polymerization conversion rate of said polymer is less than 5%.

3. A process for preparing a polymer according to claim 1, wherein the temperature of the polymerization of the monomer is maintained at a temperature of 30° C. or less before said at least one secondary amine compound is brought into contact with said organolithium compound.

4. A process for preparing a polymer according to claim 1, wherein the polymerization is carried out by addition of a randomizer to the polymerization system after said organolithium compound and said secondary amine have been brought into contact with each other.

5. A process for preparing a polymer according to claim 1, wherein said secondary amine compound is a compound selected from the group consisting of hexamethyleneimine, pyrrolidine and 1,2,3,6-tetrahydropyridine.

6. A process for preparing a polymer according to claim 1, wherein the modification efficiency (E) with secondary amine group satisfies the following equation:

$$E = \frac{\text{High Molecular Weight Polymer having Secondary Amino Group at the End of Polymerization Initiation of the Polymer Chain}}{\text{Total Polymer}} \times 100 \geq 20 \text{ Weight \%}$$

7. A process for preparing a polymer according to claim 1, wherein said coupling agent is a compound selected from the group consisting of tin compounds, silicon compounds and germanium compounds, and said electrophilic compound is a compound selected from the group consisting of amides, esters, ketones, oxiranes and isocyanates.

8. A process for preparing a polymer according to claim 7, wherein said tin compound is tin tetrachloride or dibutyltindichloride, and said silicon compound is silicon tetrachloride or dimethylsilicondichloride.

9. A process of preparing a polymer according to claim 1, wherein said conjugated diene monomer is 1,3-butadiene or isoprene.

10. A process for preparing a polymer according to claim 1, wherein said vinylaromatic hydrocarbon monomer is styrene.

11. A process for preparing a polymer according to claim 1, wherein said conjugated diene monomer is butadiene and said vinylaromatic hydrocarbon monomer is styrene.

12. A process for preparing a polymer according to claim 1, wherein the amount of said organolithium compound is 0.05 to 15 m mole per 100 g of said monomer.

13. A process for preparing a polymer according to claim 1, wherein the amount of said secondary amine compound is 0.1 to 2.0 mole equivalent per 1 mole of said organolithium compound.

14. A process for preparing a polymer according to claim 1, wherein after the polymerization has substantially been completed, the number average molecular weight of said polymer is $8\times10^3$ to $1\times10^6$ before modification.

* * * * *